July 25, 1961 A. STRAUB 2,993,406

SPEED SYNCHRONIZING ARRANGEMENT FOR SEPARATE
SOUND AND MOTION PICTURE APPARATUS

Filed April 23, 1956

INVENTOR:

Albert Straub

By: Michael S. Striker agt.

United States Patent Office 2,993,406
Patented July 25, 1961

2,993,406

SPEED SYNCHRONIZING ARRANGEMENT FOR SEPARATE SOUND AND MOTION PICTURE APPARATUS

Albert Straub, Stuttgart, Germany, assignor to Eugen Bauer G.m.b.H., Stuttgart-Unterturkheim, Germany Filed Apr. 23, 1956, Ser. No. 579,789
Claims priority, application Germany Apr. 23, 1955
3 Claims. (Cl. 88—16.2)

The present invention relates to a synchronizing apparatus. More particularly, the present invention relates to an apparatus for synchronizing the reproduction reel of a sound track on a magnetic tape recorder with a motion picture projector.

In order to synchronize the rate of motion picture production with the sound track corresponding to the motion picture film, conventional apparatus includes a motion picture film with a sound track included right next to the motion picture frames. However in such an arrangement it is clear that the size of the film must be large enough to permit the sound track to be recorded thereon.

With smaller film sizes used in motion picture projection, the sound track may be recorded on independent apparatus from the motion picture film, such as for example, a magnetic tape recorder. In such arrangements it is necessary to properly synchronize the reproduction rate of the magnetic tape recorder with the transport rate of the motion picture film through the film projector.

In conventional apparatus using magnetic tape recorders it is therefore common practice to build units which include both the motion picture projector and the magnetic tape recorder mechanically coupled to each other so as to provide accurate synchronization between the tape recorder and the motion picture film. Since it is desirable to have the sound portion of the motion picture film emanating from an area near the screen on which the film is projected, it is apparent that the combined film projector and magnetic tape recorder arrangement is disadvantageous. Also, with smaller films, less expensive motion picture projectors are used and the addition of a magnetic tape recorder mechanically coupled to the projector and used just for motion picture projection purposes would increase the cost by a prohibitive amount.

With the present invention it is possible to use a conventional tape recorder on which the sound track has been recorded and to add an auxiliary apparatus driven by the tape in the tape recorder. The motion picture film projector is then synchronized to the rate of reproduction of the magnetic tape by means of the auxiliary apparatus.

It is accordingly an object of the present invention to overcome the above described disadvantages of conventional arrangements.

A second object of the present invention is to provide a new and improved apparatus for synchronizing sound tracks recorded on magnetic tape recorders with motion picture projectors.

Another object of the present invention is to provide a synchronizing apparatus for synchronizing the reproduction rate of a sound track with the projection rate of the corresponding motion picture film with an auxiliary apparatus which is driven by the sound track itself.

A further object of the present invention is to provide an auxiliary apparatus adapted to be mounted on a magnetic tape recorder and to be driven by the magnetic tape thereon, which auxiliary apparatus is used for synchronizing the reproduction rate of motion picture film corresponding to the sound track.

Still another object of the present invention is to provide synchronizing apparatus for motion picture films wherein the sound track is recorded on magnetic tape recorders wherein the magnetic tape recorder may be remotely located from the motion picture projector and only connected by means of electrical cables.

With the above objects in view the present invention relates to an apparatus for maintaining a predetermined relationship between the speed of two independent rotary members and including energizing means for energizing the rotary members causing the same to rotate, first switching means connected in circuit between the energizing means and one of the rotary members, the first switching means being movable between circuit-opening and circuit-closing positions by the other of the rotary members, and second switching means continuously movable between circuit-opening and circuit-closing positions and vice versa by the one rotary member at a rate dependent on the rotational speed of the one rotary member whereby when the predetermined relationship between the speed of the two independent rotary members exists, the relative operating positions of the first and second switching means remain constant and when the predetermined relationship does not exist, the relative operating positions of the first and second switching means are varied to vary the energization of the one rotary member until the predetermined relationship again exists.

In a preferred embodiment of the present invention the synchronizing apparatus is mounted on a base member which is attached to a magnetic tape recorder. The magnetic tape in the recorder drives a rotatable member mounted on the base member and the rotational speed of this rotatable member is used to synchronize the projection rate of the film from the motion picture projector.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
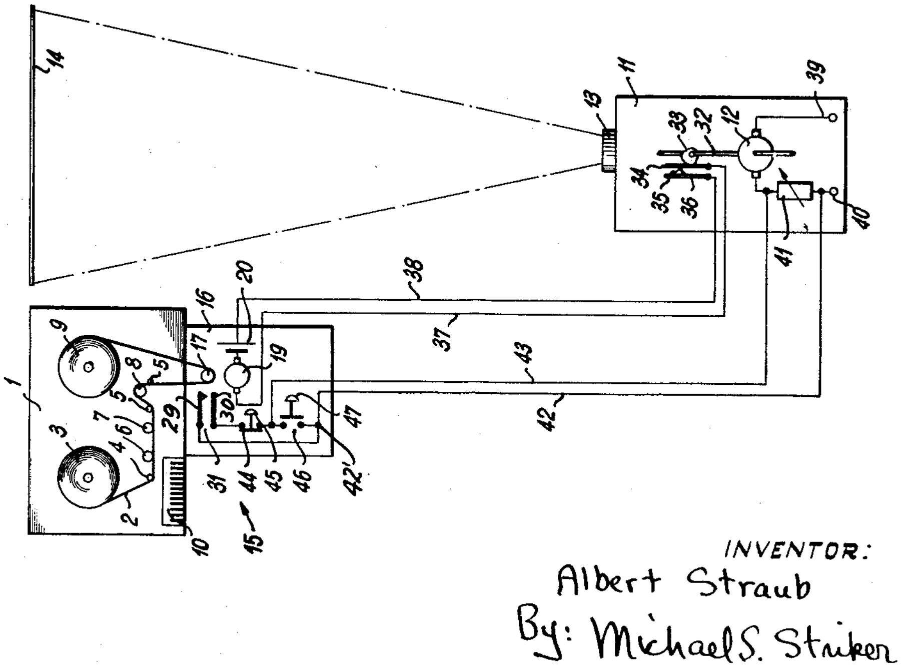
FIG. 1 is an electrical schematic diagram of the present invention showing the magnetic tape recorder and the film projector in diagrammatic form.

Referring to the drawings and more particularly to FIG. 1 it can be seen that the magnetic tape recorder is mounted on a housing 1 and includes a magnetic tape which is supplied from a supply reel 3 and which moves along a predetermined path to a take up reel 9. That is, energization of the magnetic tape recorder by means unillustrated causes the take-up reel 9 to rotate in a counterclock wise rotation to transport the magnetic tape 2 from the supply reel 3 to take-up reel 9.

An accurate rate of transport of the magnetic film 2 through the tape recorder is provided by driving roller 8 which moves the film at a predetermined rate between the supply and take-up rollers. Also provided along a predetermined path between the take-up and supply rollers are guiding rollers 4 and 5 and magnetic heads 6 and 7. As is well known in the art, the magnetic head 6 may be used for erasing the magnetic tape before the magnetic head 7 records information thereon. Similarly, the magnetic heads 6 and 7 can be used for reproducing any information already on the magnetic tape, such as a sound track. In the event that the magnetic heads are used for reproduction purposes, the resultant sound track is produced on the loud speaker 10 at the front of the tape recorder.

In accordance with the present invention an auxiliary apparatus 15 is attached to the housing 1 of the magnetic tape recorder. The apparatus 15 includes a base member 16 on which is mounted an auxiliary rotatable member 17. As can be seen in FIG. 1, the rotatable member 17 is adapted to be driven by the magnetic tape and located between the driving roller 8 and the take-up reel 9. Mounted adjacent the member 17 is a direct current motor 19 one terminal of which is connected to a source 20 of direct current potential. The other terminal of the motor 19 is connected by means of a conductor 37 to a movable contact 34 of a switch 35 mounted on the housing 11 of the motion picture projector.

The other terminal of the source of direct current potential 20 is connected on a conductor 38 to the fixed contact 36 of the switch 35. It can be seen that the movable contact 34 of the switch 35 is adapted to make contact with a cam 33 fixedly mounted on a rotatable shaft 32. The shaft 32 is driven by the motor 12 of the film projector 11, which motor is adapted to be energized by energizing means connected to terminals 39 and 40.

The terminal 39 is directly connected to one side of the motor 12 while the terminal 40 is connected to the other side of the motor 12 through a variable resistor 41.

The terminal 40 is also connected by means of a conductor 42 to a junction point 42′ mounted on the auxiliary apparatus 15 at the magnetic tape recorder 1. The junction 42′ is directly connected to the fixed contact 29 of the switch 31 mounted adjacent the rotatable member 17. The movable contact 30 of the switch 31 is connected to one terminal of a normally closed push button switch 44 having a manually operable push button member 45. The other terminal of the switch 44 is connected to a conductor 43 which in turn is connected to the junction point between the variable resistor 41 and the one side of the motor 12 of the motion picture projector. This terminal of the switch 44 is also connected to one side of a normally open push button switch 46 having a manually operable push button member 47, the other terminal of which is connected to the junction 42′.

It is clear that the motion picture projector 11 also is provided with an objective lens 13 for projecting the pictures on a motion picture film onto a screen 14 which is remotely located therefrom. It is also apparent that the magnetic tape recorder having the speaker 10 therein is located adjacent the motion picture screen 14.

On the auxiliary apparatus 15, the rotatable member 17 is coupled to the shaft of the direct current motor 19. This coupling means is more clearly shown in FIG. 2. Referring to this figure it can be seen that the rotatable member 17 is connected to a rotatable shaft 18 which is rotatable therewith and that the motor 19 has a rotatable shaft 27 which is substantially axially aligned with the shaft 18. A substantially tubular coupling member 21 is connected between the shafts 18 and 27. It can be seen that the coupling member 21 is mounted on the shaft 18 so as to be rotatable therewith by means of the cooperation between a pin 22 extending into the shaft 18 and a longitudinal slot 23 in the coupling member 21. This arrangement causes the coupling member 21 to rotate directly with the shaft 18 but permits axial displacement on the coupling member 21 with respect to the shaft 18.

At the other end of the coupling member 21, the tubular end portion is provided with a recess having a substantially helical surface 25 and a portion 24 substantially parallel to the axis of the shafts 18 and 27. Cooperating with this recess in the coupling member 21 is a pin 26 fixedly mounted in the rotatable shaft 27. It can also be seen that the coupling member 21 is provided with a disk-shaped member 28 mounted thereon, one portion of which makes sliding contact with the movable contact 30 of the switch 31.

The coupling member shown in FIG. 2 operates in the following manner. When the shafts 18 and 27 are rotating at precisely the same speeds in a clockwise direction, the coupling member 21 will remain in the illustrated position. That is, since the shafts 18 and 27 are preferably vertically mounted, the longitudinal slot 23 in the coupling member 21 has its upper portion in contact with the pin 22 of the shaft 18.

However, in the event that the motor 19 rotates the shaft 27 at a rotational speed which is less than the rotational speed of the shaft 18, it is clear that the helical surface 25 will slide along the pin 26. Therefore, the coupling member 21 will be moved axially upwardly with the longitudinal slot 23 thereof moving upwardly past the pin 22. When this occurs, the disk-shaped member 28 mounted on the coupling member 21 will move the movable member 30 of the switch 31 into contact with the fixed contact 29 thereof. When the speed of the rotating shafts 18 and 27 is again synchronized, the coupling member 21 will return to the illustrated position and the movable member 30 will be moved away from the fixed contact 29 of the switch 31.

Figure 2:
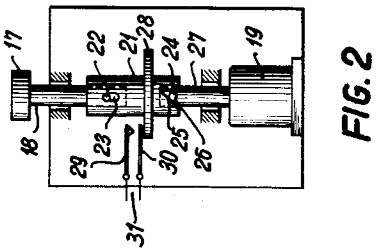
FIG. 2 is an elevational view of a coupling used with the present invention.

Referring now to FIGS. 1 and 2 the operation of the apparatus will be described. The magnetic tape recorder is energized as is the motor 12 of the film projector. If desirable the same switching arrangement can be used for simultaneously energizing the motion picture projector and the magnetic tape recorder. The constants of the motor 12 and the resistor 41 are chosen so that the motor 12 will normally run at a speed somewhat lower than the desired synchronized speed. That is the motor 12 will run at a speed somewhat slower than the reproduction rate of the magnetic tape in the tape recorder 1.

As the motor 12 rotates its shaft 32, the cam 33 fixedly mounted thereon and rotatable therewith will rotate at a rate dependent upon the rotational speed of the shaft 32. Therefore the movable contact 34 of the switch 35 will make electrical contact with the fixed contact 36 thereof for predetermined periods of the rotational cycle dependent upon the arrangement of the cam 33. The cam 33 is so arranged that a pulsating current will be provided from the direct current source 20 through the switch 35 to the motor 19, which pulsating current will be varied at a rate equal to the rotational speed of the shaft 32. Therefore, the direct current motor 19 will be energized at a rate equivalent to the rotational speed of the shaft 32 and will rotate its respective shaft 27 with the same rotational speed.

In the meantime, the rotatable member 17 will be rotating the shaft 18 at a rotational speed dependent upon the rate of transport of the magnetic tape through the tape recorder 1. If the rotational speed of the shaft 18 and the rotational speed of the shaft 27 is the same, the coupling member 21 will remain in the illustrated position and the motor 12 will continue to rotate the shaft 32 at the same speed. However, since the constants of the motor 12 are chosen so that the motor will rotate the shaft 32 at a slightly lower speed than the desired synchronized speed, the shaft 27, connected to the motor 19 will soon be running at a slower speed than the rotational speed of the shaft 18.

Therefore, the coupling member 21 will be axially displaced and the movable member 30 of the switch 31 will move to close the switch 31. It can be seen that this will short circuit the resistor 41. This will place the entire voltage applied across the supply terminals 39 and 40 directly across the terminals of the motor 12. This, of course, will increase the rotational speed of the motor 12 which will thereby rotate the shaft 32 thereof at a higher rotational speed. This will increase the rate of opening and closing of the switch 36, thereby increasing the rate of energization of the motor 19. Therefore, the shaft 27 of the motor 19 will then run at a higher rotational speed approaching the speed of the shaft 18. When this synchronized speed is reached, the coupling member 21 will drop back to the illustrated position, opening the switch 31, and removing the short circuit from the resistor 41. The resistor 41 will now be rendered effective and will act as regulating means for again slowly decreasing the rotational speed of the motor 12 until the coupling member 21 again becomes effective to short circuit the resistor. It is apparent that this will continue with the means speed of the rotational shafts 18 and 27 being substantially the same. Therefore, the rate of transport of the film through the motion picture projector 12 will be accurately synchronized with the rate of transport of the magnetic tape through the magnetic tape recorder 1. It should be appreciated that the control provided by this synchronizing arrangement is a very fine control and that although the speed of the motor 12 varies over very small range to permit the proper synchronization, this small range is actually negligible with respect to the accurate reproduction of the sound and motion picture film.

Since the arrangement illustrated in FIGS. 1 and 2 carries out such a fine synchronization control, it is advisable to provide coarser control means which will bring the sound track and film closer to synchronization when they are originally started a larger distance apart. That is, in the event the projector and the magnetic tape recorder are energized and it is seen that the sound track on the magnetic tape is quite far from being synchronized with the motion picture, the fine control provided by the present arrangement will take an appreciable amount of time to bring the sound track into synchronism with the motion picture. Therefore the push button switches 44 and 46 having respectively manually operable members 45 and 47 are provided.

It can be seen that if the normally closed switch 44 is opened, it will be impossible for the switch 31 to short circuit the resistor 41. That is, the action of the switch 31 will be rendered ineffective by opening of the push buttons 44. Therefore the resistor 41 will always be in series with the motor and the motor 12 runs continuously at a slower speed until the synchronization is again brought into line.

On the other hand, if the sound track is ahead of the motion picture and it is desired to bring the motion picture up into synchronism by the coarse control, the manually operable member 47 of this normally open switch 46 is pressed to close the switch 46. This will short circuit the resistor 41 regardless of the action of the switch 31. Therefore the speed of the motor 12 will be increased until the motion picture is again near synchronism with the sound track and the switch 46 is released to permit the fine control of the present invention to bring the sound and motion picture directly into accurate synchronism.

It should be noted that the only connections between the magnetic tape recorder and the film projector are the cables 37, 38 and 42, 43. These can easily be included in a single thin cable extending between the two apparatus so that the magnetic tape recorder can be easily remotely located from the motion picture projector.

In the embodiment described hereinabove, the motor 12 is preferably a universally wound motor so that it can be energized either by alternating-current or direct-current. In the event it is desired to use an induction motor, a similar arrangement can be used wherein the resistor 41 and the constants of the induction motor will be chosen so that the motor 12 will run at a higher speed than the desired synchronization speed when the resistor 41 is connected. In this arrangement the switch 31 would then be in series with the motor normally closed and would be opened by the axial movement of the coupling member 21. When the motor runs too fast.

It is also clear that instead of a switch 35 located at the motion picture projector and the direct-current source, it would be possible to mount a generator on the shaft 32 of the motor 12 for generating voltages to energize the motor 19. In such an arrangement the generator would develop a voltage having a frequency depending upon the rotational speed of the shaft 32 and the motor 19 would run synchronously with the voltage produced by the generator.

Figure 3:
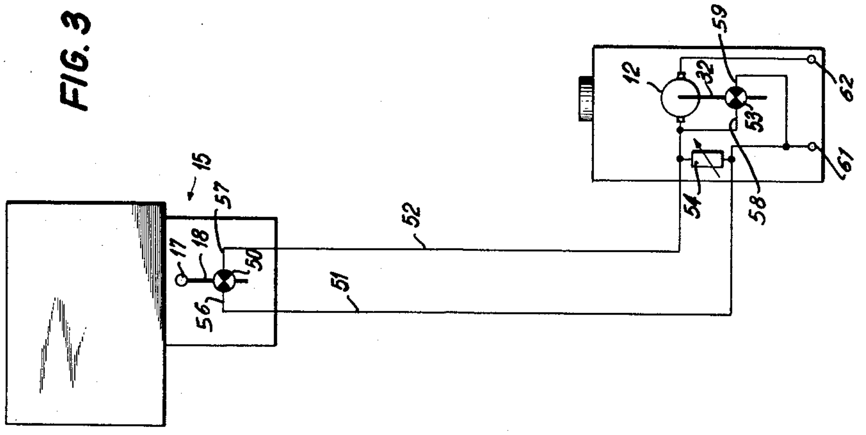
FIG. 3 is an electrical schematic diagram of still another embodiment of the present invention.

Referring now to FIG. 3 still another embodiment of the present invention is shown. In this embodiment there is no additional motor 19 mounted on the base member. Rather the auxiliary apparatus 15 includes the rotatable member 17 and the shaft 18 connected thereto. In addition a rotary switch 50 which operates as a circuit breaker is mounted on the shaft 18 and is rotatable therewith.

Adjacent the switch 50 is a fixed content 56 which makes sliding contact with the member 50 and which in turn is connected by conductor 51 to one terminal of a resistor 54 and to a supply terminal 61 which is one of two supply terminals 61 and 62 for the motion picture motor 12. The switch 50 also is in sliding contact with a second fixed contact 57 which is connected by means of conductor 52 to the other side of the variable resistor 54 and to one terminal of the motor 12, the other terminal of which is connected directly to the supply terminal 62. The motor 12 has a rotatable shaft 32 which has mounted thereon a rotating circuit breaker 53. It can be seen that one contact 58 of the circuit breaker 53 is connected to one side of the resistor 54 and the other contact 59 thereof is connected to the other side of resistor 54.

The rotary switches 50 and 53 are disk members which have electrically insulating and electrically conductive portions. In certain part of the rotational cycle the electrical circuit between contacts 56 and 57 is completed. Similarly through a certain portion of the cycle of rotation of the shaft 32, the electrical circuit between the contacts 58 and 59 is completed by the rotary switch 53.

The insulating and conductive portions of the switches 50 and 53 are arranged so that during half of their rotational cycle their respective fixed contacts will be electrically connected together. In FIG. 3 the black portions of the circuit breakers 50 and 53 correspond to insulated portions and the light portions correspond to conductive portions. Therefore it can be seen that the contact will be made between contacts of the respective circuit breakers during two 90° intervals of each rotational cycle.

If the relative phase displacement between the circuit breakers 50 and 53 is 90°, it can be seen that at least one of the circuit breakers will be conducting during the entire rotational cycle of the shafts 18 and 32. That is, if the shafts 18 and 32 are running synchronously, the resistor 54 will be short circuited by either the circuit breaker 50 or the circuit breaker 53 during respectively different halves of the rotational cycle. Therefore the resistor 54 will be short circuited during the entire rotational cycles of the shafts.

In the event that the motor 12 starts to run at a faster speed than the tape recorder 1, its shaft 32 will increase the phase angle of the circuit breaker 53 with respect to the circuit breaker 50. Therefore for a small portion of the rotational cycle, the resistor 54 will be placed in series with the motor 12. This will tend to slow down the motor 12 until the circuit breakers are again exactly 90° displaced from one another.

Of course, if the motor 12 is an induction motor, the synchronization can be carried out in a corresponding manner.

If desired, in the embodiment of FIG. 3, normally closed and open push button switches can be properly located in the circuit, similarly to the arrangement shown in FIG. 1 in order to override the effect of the switches 50 and 53.

In the above embodiments, the arrangement has been described as a synchronizing arrangement. That is, this arrangement controls the speed of the two independent rotary members so that they are exactly equal to each other. However it is clear that a predetermined relationship may similarly be maintained between the relative rotational speeds of the two rotary members. That is, if a fixed speed differential is desired or a ratio such as 2 to 1, etc., is desired, the present apparatus can similarly be used by properly arranging the cams and switch elements.

It will be understood that each of the elements described above, or two or more together, may also find a useful application in other types of spaced regulating apparatus differing from the types described above.

While the invention has been illustrated and described as embodied in apparatus for synchronizing sound motion picture projections with a sound track recorded on an independent magnetic tape recorder, it is not intended to be limited to the details shown, since various modifications and structural changes may be made without departing in any way from the spirit tof the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a sound motion picture projection arrangement wherein the sound track for the film is provided by a magnetic tape recorder and reproducer, apparatus for maintaining the rate of film projection synchronized with the reproduction rate of the sound track, comprising, in combination, an independent detachable base member mounted adjacent the magnetic tape recorder; a rotatable member mounted on said base member and adapted to be engaged by the magnetic tape and to be continuously rotated by the same at a rate proportional to the feed rate of the magnetic tape during sound reproduction from said tape; first switching means mounted on said base member and actuated by the rotatable member, second switching means mounted adjacent the motion picture projector adapted to be actuated at a rate edependent on the transport rate of the projector; both switching means connected in circuit between said projector and the energizing means for energizing said projector, whereby the relative operating positions of said switching means vary the energization of the motion picture projector until the said synchronization exists, said base member and the elements mounted thereon forming an auxiliary unit operatively connected to said tape recorder only by the magnetic tape engaging said rotatable member and said auxiliary unit being only electrically connected to said motion picture projector so that the latter may be conveniently located at any distance from said tape recorder and said auxiliary unit connected thereto.

2. In a sound motion picture projection arrangement wherein the sound track for the film is provided by a magnetic tape recorder and reproducer, apparatus for maintaining the rate of film projection synchronized with the reproduction rate of the sound track, comprising, in combination, an independent detachable base member mounted adjacent the magnetic tape recorder; a first rotatable shaft mounted on said base member and adapted to be engaged by the magnetic tape and to be continuously rotated by the same at a rate proportional to the feed rate of the magnetic tape during sound reproduction from said tape; a second rotatable shaft mounted on said base member adjacent said first rotatable shaft; shifting means operatively connected to said first and second rotatable shafts so as to be shifted thereby when said shafts rotate, respectively, at different speeds; first energizing means for energizing the motion picture projector to transport the motion picture film therethrough at a rate substantially equal to the reproduction rate of the magnetic tape; driving means mounted on said base member for continuously rotating said second rotatable shaft when energized; second energizing means for energizing said driving means; first switching means only electrically connected in circuit between said driving means and said second energizing means and being continuously moved between circuit opening and circuit closing position by the motion picture projector whereby said driving means is energized at a rate equal to the transport rate of the motion picture film; and second switching means mounted on said base member adjacent said shifting means in circuit between said first energizing means and the motion picture projector and adapted to be moved by said shifting means between circuit opening position and circuit closing position whereby when said motion picture projector, said first and second rotatable shafts are all rotated at the same speed, said second switching means remains in one of its positions and when said motion picture projector and said second rotatable shaft are rotating at speeds different from said first rotatable shaft, said shifting means moves said second switching means into the other of its positions to provide the proper regulation for the motion picture projector, said base member and the elements mounted thereon forming an auxiliary unit operatively connected to said tape recorder only by the magnetic tape engaging said first rotatable shaft and said auxiliary unit being only electrically connected to said motion picture projector so that the latter may be conveniently located at any distance from said tape recorder and said auxiliary unit connected thereto.

3. In a sound motion picture projecting arrangement including a film projection unit having a motor for feeding a motion picture film and a sound producing unit in which the sound is reproduced from a magnetic tape driven with a predetermined speed, an apparatus for synchronizing the speed of said motor with said predetermined speed comprising, in combination, a first rotatable member adapted to be engaged by the magnetic tape so as to be continuously rotated by the same during reproduction of sound therefrom at a rate proportionate to the feed rate of the tape; a second rotatable member arranged adjacent said first rotatable member; electrical drive means for continuously rotating said second rotatable member when energized; means for energizing said electrical drive means; first switch means only electrically connected in circuit between said energizing means and said electrical drive means and operatively connected to the motor of said film projection unit so as to be continuously rotated thereby between circuit opening and circuit closing positions whereby said electrical drive means is energized at a rate proportionate to the feed rate of the motion picture film; resistor means in circuit with the motor of the film projection unit for regulating the speed thereof; second switch means in circuit with said resistor means and movable between a closed position in which said second switch means shortcircuits said resistor means and an open position, said second switch means being operatively connected to said first and second rotatable members so as to be moved to said closed position thereof when said second rotatable member is rotated with a speed smaller than said first rotatable member; and a base member for mounting said first and second rotatable members said electrical drive means and said second switch means thereon, said base member and the elements mounted thereon forming an auxiliary unit adapted to be detachably connected to said sound producing unit and operatively connected thereto only by the magnetic tape engaging said first rotatable member, whereas said auxiliary unit is only electrically connected to said film projecting unit so that the latter can be conveniently arranged at any distance from said sound projecting unit and the auxiliary unit connected thereto.

(References on following page)

References Cited in the file of this patent

UNITED STATES PATENTS

| | | |
|---|---|---|
| 1,314,081 | Kozar | Aug. 26, 1919 |
| 1,362,876 | Kozar | Dec. 21, 1920 |
| 1,722,644 | Trenor | July 20, 1921 |
| 1,777,418 | Rogers | Oct. 7, 1930 |
| 1,988,980 | Debrie | Jan. 22, 1935 |
| 2,074,517 | Ross | Mar. 23, 1937 |
| 2,394,361 | Bruderlin | Feb. 5, 1946 |
| 2,486,082 | Wagner | Oct. 25, 1949 |
| 2,584,645 | Wagner | Feb. 5, 1952 |
| 2,693,127 | Ortman | Nov. 2, 1954 |
| 2,760,137 | Andrews | Aug. 21, 1956 |

FOREIGN PATENTS

| | | |
|---|---|---|
| 153,220 | Switzerland | June 16, 1932 |
| 282,895 | Germany | Mar. 25, 1915 |